United States Patent [19]

Fukushima et al.

[11] Patent Number: 5,742,801
[45] Date of Patent: Apr. 21, 1998

[54] MICROPROCESSOR TO WHICH ADDITIONAL INSTRUCTIONS ARE ADDED AND INSTRUCTIONS ADDITION METHOD THEREOF

[75] Inventors: Masanobu Fukushima, Sanda; Yukio Kadowaki, Nara; Masanori Itoh, Osaka, all of Japan

[73] Assignee: Ricoh Company, Ltd., Tokyo, Japan

[21] Appl. No.: 595,765

[22] Filed: Feb. 2, 1996

[30] Foreign Application Priority Data

| Feb. 2, 1995 | [JP] | Japan | 7-016274 |
| Apr. 14, 1995 | [JP] | Japan | 7-089253 |
| Jun. 7, 1995 | [JP] | Japan | 7-140540 |

[51] Int. Cl.[6] .................................................. G06F 11/00
[52] U.S. Cl. .................................................. 395/568
[58] Field of Search .................................. 395/385, 388, 395/568, 598, 183.14, 183.04, 183.06, 500

[56] References Cited

U.S. PATENT DOCUMENTS

| 3,781,823 | 12/1973 | Senese | 395/385 |
| 4,028,670 | 6/1977 | Hoffman et al. | 395/385 |
| 4,167,229 | 9/1979 | Sullivan et al. | 395/388 |
| 4,419,726 | 12/1983 | Weidner | 395/385 |
| 4,841,476 | 6/1989 | Mitchell | 395/568 |
| 4,876,639 | 10/1989 | Menisch, Jr. | 395/385 |
| 4,972,317 | 11/1990 | Buonomo et al. | 395/568 |
| 5,115,500 | 5/1992 | Larsen | 395/385 |
| 5,430,862 | 7/1995 | Smith et al. | 395/568 |
| 5,454,086 | 9/1995 | Alpert et al. | 395/568 |
| 5,481,684 | 1/1996 | Richter et al. | 395/568 |

*Primary Examiner*—William M. Treat
*Attorney, Agent, or Firm*—Cooper & Dunham LLP

[57] ABSTRACT

A microprocessor to which additional instructions from outside of the microprocessor are added and an instructions addition method are provided. The microprocessor includes an unrewritable register and if an instruction decoder in the microprocessor decodes additional instructions which appoint or designate the unrewritable register as a destination register, the additional instructions are added to the microprocessor on the basis of the decoded signals of the additional instructions. The present microprocessor can execute instructions addition while maintaining the compatibility of software for the additional instructions to prepared instructions in the microprocessor.

28 Claims, 3 Drawing Sheets

MICROPROCESSOR TO WHICH ADDITIONAL INSTRUCTIONS ARE ADDED AND INSTRUCTIONS ADDITION METHOD THEREOF

BACKGROUND OF THE INVENTION

1. Field of the Invention

The present invention generally relates to a microprocessor to which additional instructions can be added and an instructions addition method. More specifically, the present invention relates to a microprocessor having fixed-value registers or unrewritable registers, such as a RISC processor, for executing the additional instructions in the microprocessor, and the instructions addition method.

2. Discussion of the Background

Generally, processing apparatuses in which instructions are read out, interpreted and executed, are often utilized as an architecture for a development tool or a debugger. To perform such tasks, additional instructions, such as instructions for the development tool or the debugger, are needed.

However, when adding these additional instructions, the compatibility of the software for the additional instructions to prepared instructions in the processor has to be maintained. Conventionally, circuits in the processor were modified in order to maintain the compatibility of the software. As a result, such circuitry is complicated and the costs involved in developing such circuitry are high.

SUMMARY OF THE INVENTION

Accordingly, one object of the present invention is to provide a novel microprocessor, in which instructions are read out, interpreted and executed, which can execute the additional instructions while maintaining the compatibility of software for the additional instructions to prepared instructions in the processor.

Another object of the present invention is to provide a novel instructions addition method to a microprocessor, that can easily add additional instructions without considerable modification of circuits in the processor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
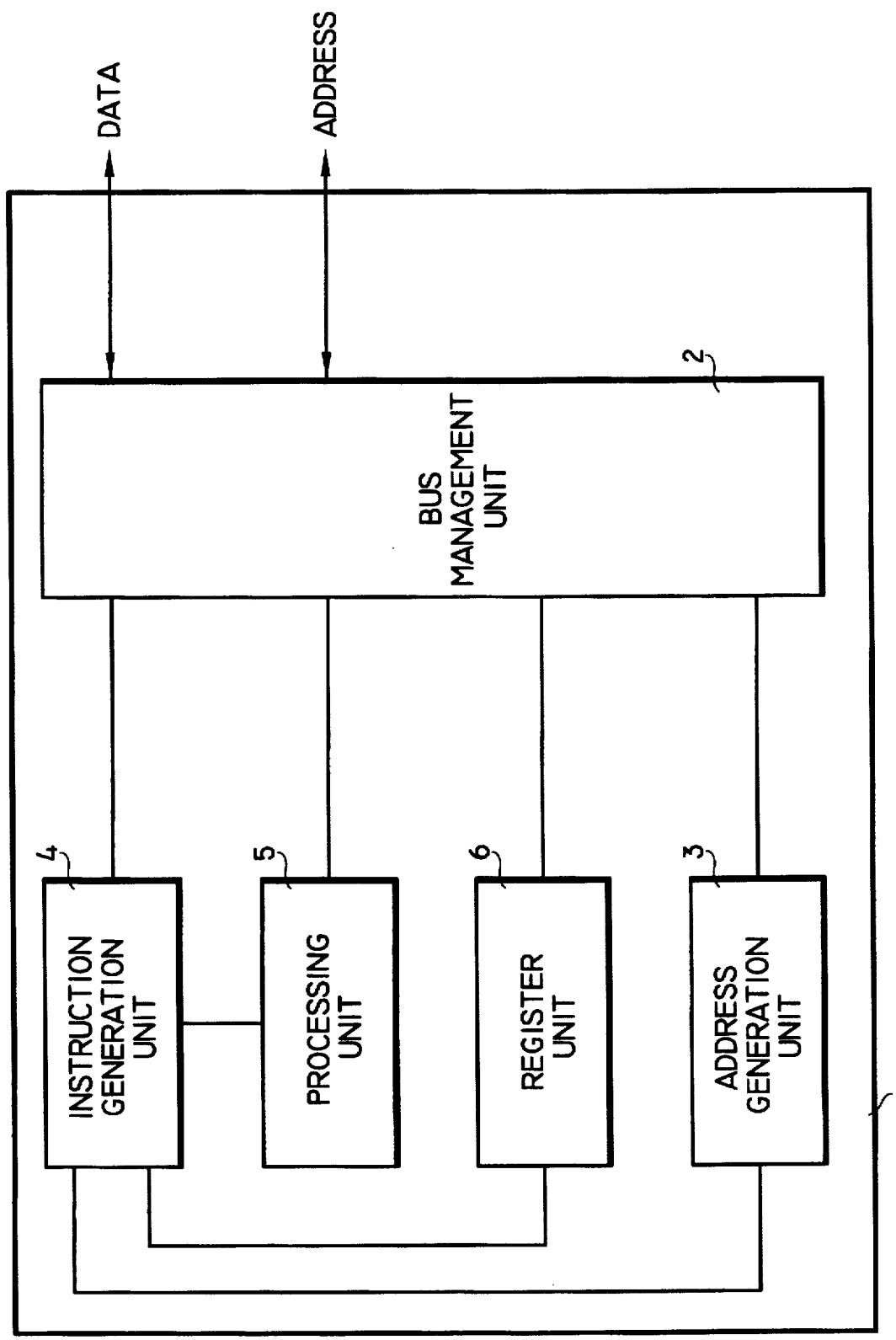
FIG. 1 is a block diagram of a general microprocessor in which the present invention is applied.

Referring now to the drawings, wherein like reference numerals designate identical or corresponding parts throughout the several views and more particularly to FIG. 1 thereof, there is illustrated a block diagram of a general microprocessor in which the present invention is applied.

The microprocessor 1 shown in FIG. 1 includes a bus management unit 2, an address generation unit 3, an instruction generation unit 4, a processing unit 5, and a register unit 6. The bus management unit 2 is connected to the address generation unit 3, instruction generation unit 4, processing unit 5, and the register unit 6, and data or addresses external to the microprocessor are inputted through the bus management unit 2 into the address generation unit 3, the instruction generation unit 4, the processing unit 5, and the register unit 6. The address generation unit 3 includes, for example, a program counter, and is configured to transfer out addresses. The instruction generation unit 4 decodes instructions and generates various signals, such as timing signals and control signals. The processing unit 5 executes various instructions, such as arithmetic of integers and logical operations. The register unit 6 stores information, such as data and addresses. In this embodiment, the register unit 6 includes a fixed-value register, or an unrewritable register which is defined as a fixed-value register, as discussed below. Normally, in a microprocessor which includes fixed-value register, load instructions of which destination is a fixed-value register are executed as non-operation instructions, defined hereinbelow its NOP instructions. In this embodiment, additional instructions are added by utilizing instructions of which destination is the fixed-value register.

For example, the microprocessor 1 may include thirty-two wide-use registers r0 to r31, where the register r0 is a zero register which is one of the fixed-value registers. The register r0 in this example stores a zero value. In such a microprocessor 1, the zero register can be appointed or designated as a source register or a destination register in the instruction codes.

Since, the register r0 is an unrewritable register which stores a zero value the microprocessor 1 executes NOP instructions responding to a load instructions in which the register r0 is appointed as a destination register.

To illustrate, suppose that the microprocessor 1 includes the following load instruction (1) between registers dr1 and sr1 included in the load instruction (1).

$$ld\ dr1,\ sr1 \qquad (1)$$

In the above expression, the register sr1 is defined as a source register and the register dr1 is defined as a destination register. Further suppose that the following load instruction (2) is executed in the microprocessor 1.

$$ld\ r1,\ r2 \qquad (2)$$

When the above instruction (2) is executed, contents of the register r2 are copied into the register r1.

On the other hand, suppose that the following load instruction (3) is executed in the microprocessor 1.

$$ld\ r0,\ r2 \qquad (3)$$

In this circumstances, since the register r0 is an unrewritable register, the load instruction to write the contents of the register r2 into the register r0 operates as a NOP instructions' operation.

In the microprocessor 1, there are some instances in which some instructions are required to be added. One of those instances, for example, is to prepare a register into which data in the microprocessor can be written for a use as a developing tool of a microprocessor, and to add instructions which can be written into the register by instructions from the microprocessor 1. In such a case, the microprocessor 1 may be constructed so that when a decoder in the microprocessor 1 decodes instructions which designate a fixed-value register as a destination register, the additional instructions can be added by utilizing the decode signals.

The above additional instructions are, for example, instructions for a developing tool, instructions for debugging, instructions for electric communication, instructions for user defining, and so on.

Furthermore, in the case where the instructions designate a fixed-value register as a destination, if the architecture which operates the instructions to become instructions for writing data into a special register for a developing tool, a testing register, a register for debugging, and so on is prepared, instructions addition can be executed easily.

Figure 2:
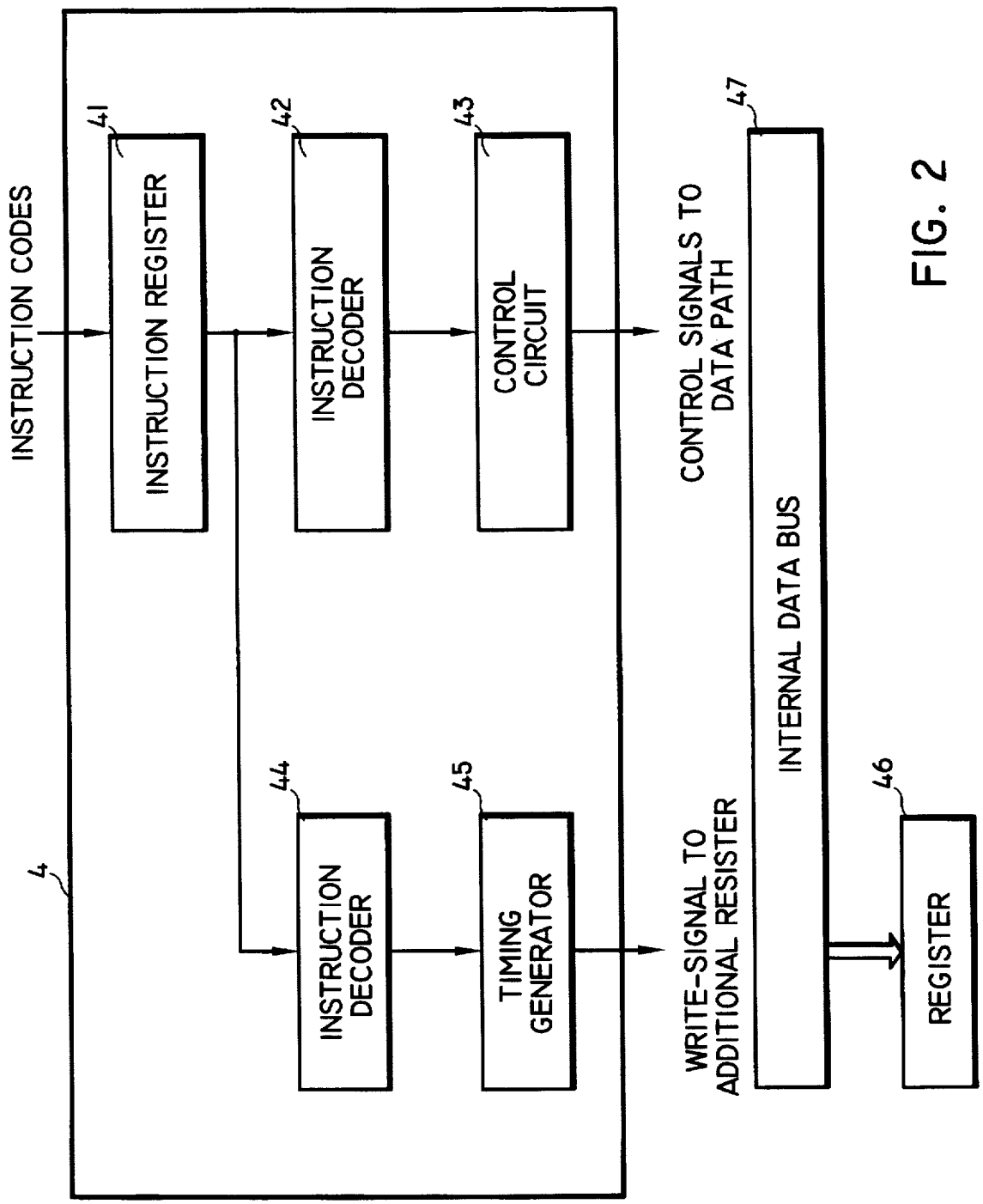
FIG. 2 is an internal block diagram of an instruction generation unit in a microprocessor according to the present invention.

FIG. 2 shows an internal block diagram of an instruction generation unit 4 in a microprocessor 1 of a first embodiment according to the present invention.

In FIG. 2, the instruction generation unit 4 includes an instruction register 41, an instruction decoder 42, a control circuit 43, an additional instruction decoder 44, and a timing generator 45. The instruction generation unit 4 receives instruction codes from the bus management unit 2, seen in FIG. 1, and stores those instruction codes in the instruction register 41. Then, the instruction codes stored in the instruction register 41 are transferred to an instruction decoder 42 and then decoded by the decoder 42. The data decoded by the instruction decoder 42 are then transferred to a control circuit 43. The control circuit 43 generates various signals, such as timing signals and control signals, according to the above decoded instructions by the instruction decoder 42, and the generated signals are then transferred to a data path.

Also, instruction codes stored in the instruction register 41 are provided to the instruction decoder 44. The additional instruction decoder 44 decodes a field for instruction distinction (opcode) and a field for destination register appointment or designation (destination register operand) in instruction codes. In the case that the instructions indicate load instructions and the destination register is a fixed-value register, in the above example, the fixed-value register is register r0 which is a zero register that stores a zero value, and the additional instruction decoder 44 generates an active signal to the timing generator 45.

Continuing to refer to FIG. 2, the internal data bus 47 in the microprocessor 1 is connected to an additional register 46 used for adding instructions. In the case where the signal decoded by the instruction decoder 44 is active, the above timing generator 45 generates a write-signal to the additional register 46. The write-signal is utilized for writing instructions into the additional register 46, by a cycle of writing data into the destination register, and then the additional instructions are written into the additional register 46.

The operation of the microprocessor 1 of the above-mentioned first embodiment of the present invention will now be explained with reference to FIGS. 1 and 2.

First, a field for instruction distinction (opcode) and a field for destination register appointment or designation (destination register operand) in instruction codes, which are transferred from the bus management unit 2 and are stored into the instruction register 41, are decoded by the instruction decoder 42 or the additional instruction decoder 44. In the case where the instructions indicate load instructions and the destination register is register r0, the additional instruction decoder 44 outputs an active signal to the timing generator 45.

At this time, if the signal decoded by the additional instruction decoder 44 is active, the timing generator 45 generates a write-signal to the additional register 46 by a cycle of writing data into the destination register. Then source data are stored into the additional register 46, which is connected to the internal data bus 47, and are transferred by the above write signal at the time when wide-use registers are rewritten.

By using instruction codes decoded by the instruction decoder 42, the register r0 is appointable as a source register or a destination register. However, when the register r0 stores a zero value it is unrewritable. Accordingly, in such a circumstance, the microprocessor 1 executes NOP instructions responding to load instructions in which the register r0 is appointed as a destination register.

Figure 3:
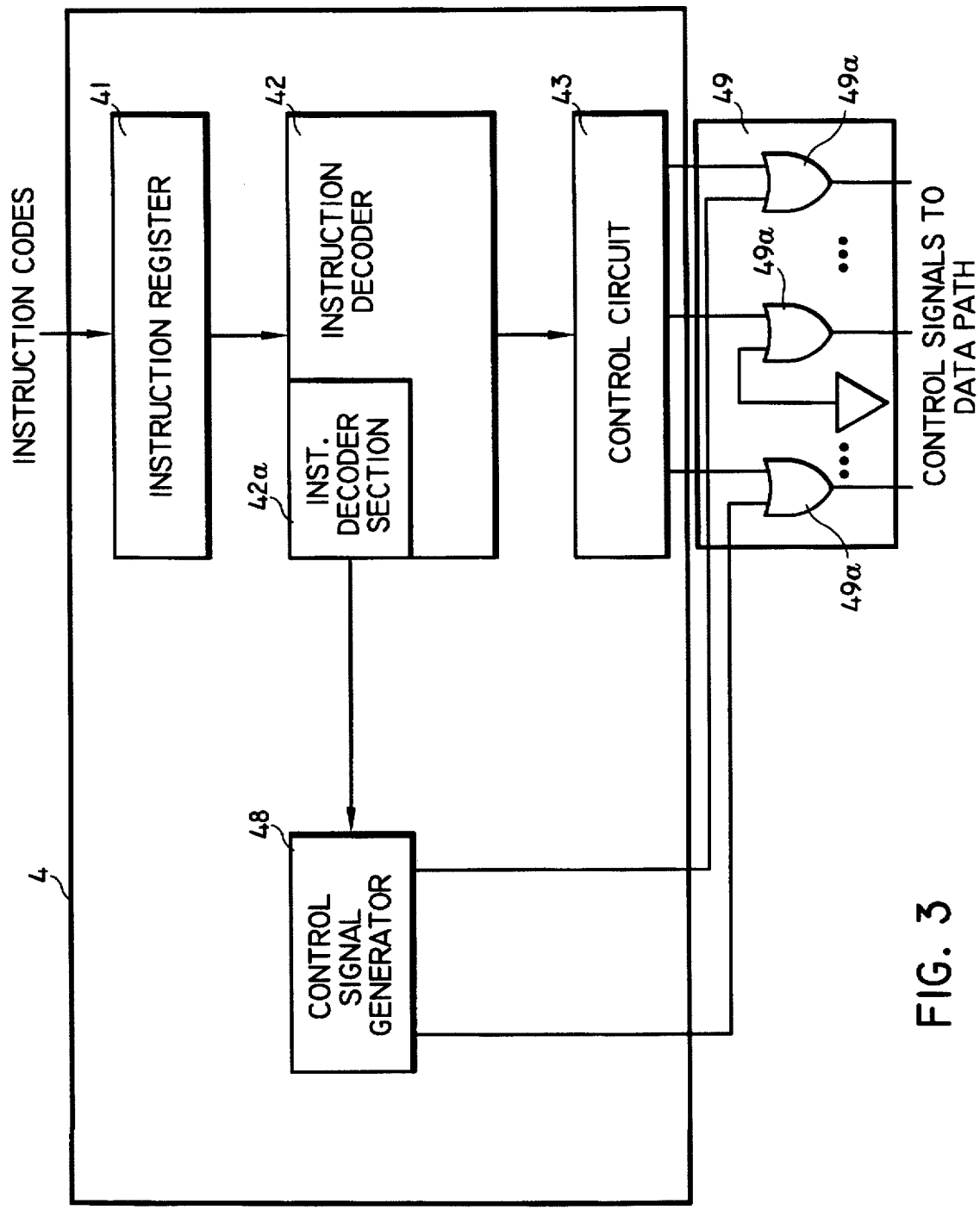
FIG. 3 is an internal block diagram of an alternative embodiment of the instruction generation unit in a microprocessor according to the present invention.

Referring now to FIG. 3, there is illustrated an internal block diagram of another instruction generation unit 4 in the microprocessor 1 of a second embodiment according to the present invention.

In this embodiment, the instruction generation unit 4 includes an instruction register 41, an instruction decoder 42, a control circuit 43, and an additional control signal generator 48. The instruction decoder 42 according to this embodiment, includes an additional instruction decoder section 42a. The instruction register 41 is connected to the bus management unit 2, seen if FIG. 1. The instruction decoder 42 is connected to the instruction register 41, and the control circuit 43. The additional control signal generator 48 is connected to the additional instruction decoder section 42a in the instruction decoder 42. Each output from the control circuit 43 is connected to one input line of the corresponding OR gates 49a included in gate circuit unit 49. Each output from the additional control signal generator 48 and the ground lines are connected to the other input of each OR gate 49a in the gate circuit unit 49, as seen in FIG. 3. The outputs from the OR gates 49a are defined as control signals and are transferred to a data path.

Instruction generation unit 4 of this second embodiment is similar in function to the instruction generation unit of the above-mentioned first embodiment. That is, the instruction generation unit 4 receives instruction codes from the bus management unit 2, stores those instruction codes into the instruction register 41, and transfers various signals, such as timing signals and control signals, generated from the instruction codes, to a data path through the control circuit 43. In the above procedure, the instruction codes stored in the instruction register 41 are transferred to the instruction decoder 42 and then decoded by the decoder 42. At this time, the additional instruction decoder section 42a is prepared in the instruction decoder 42 in the instruction generation unit 4 of this second embodiment. The additional instruction decoder section 42a determines whether or not the instruction codes, which are transferred to the instruction decoder 42, indicate NOP instructions.

The instruction codes decoded in the instruction decoder unit 42, except the additional instruction decoder section 42a, are transferred to the control circuit 43. However, when the additional instruction decoder section 42a determines that an instruction code indicates a NOP instruction, the decoder section 42a transfers an active signal to the additional control signal generator 48. The control circuit 43 generates various signals, such as timing signals and control signals, according to the above decoded instructions by the instruction decoder 42, and the various signals are then transferred to a data path through the gate circuit unit 49 which, as noted above, includes OR gates 49a.

Instruction codes of which a destination register is appointed (or designated) to the above register r0, which is one kind of fixed-value registers, operate as NOP instructions in the microprocessor 1. Accordingly, instructions by the instruction codes can be considered as NOP instructions. Therefore, in this embodiment, it is supposed that the additional instruction decoder section 42a also considers other instruction codes of which a destination register is appointed to a fixed-value register as NOP instructions, and the additional instruction decoder section 42a provides an active signal to the addition control signal generator 48.

Furthermore, in the microprocessor 1 of this embodiment, plural NOP instructions are prepared for additional instruction use beforehand when the microprocessor is designed. In this embodiment, the plural NOP instructions are assigned to different instruction codes. Instruction codes are decoded in the additional instruction decoder section 42a, and if the instruction codes are determined to be NOP instructions, the additional control signal generator 48 provides an active signal. At this time, it is preferred that the NOP instructions include NOP instructions of various cycles, such as one cycle NOP instructions, two cycle NOP instructions, and three cycle instructions, so as to cope with various kinds of additional instructions.

The operation of the microprocessor according to the above second embodiment will now be explained with reference to FIGS. 1 and 3.

First, instructions of which a destination register is appointed to a fixed-value register or NOP instructions which operate by a similar cycle to additional instructions is selected. Then, instruction codes of the above instructions or NOP instructions are provided from the bus management unit 2 to the instruction register 41. The instruction codes are decoded in the additional instruction decoder section 42a, and the decoded signals and signals which indicate each cycle are then provided to the gate circuit unit 49. As a result, special instructions which are used for various kinds of applications can be added.

As mentioned above, the present microprocessor includes a fixed-value register or an unrewritable register. Furthermore, the present microprocessor includes a special decoder in an instruction generation unit in the microprocessor. The decoder decodes instructions which appoint a fixed-value register or an unrewritable register in a register unit as a destination register. Furthermore, the present microprocessor includes a special decoder in an instruction generation unit in the microprocessor. The decoder decodes instructions which appoint a fixed-value register or an unrewritable register in a register unit as a destination register. Additional instructions are added by utilizing the decoded signals generated by the decoder. That is, while instructions which appoint (or designate) such a register as a destination register operate as NOP instructions, the register operates as a normal unrewritable register to signals of program control fields, such as a program counter control, a divergence control, or signals of bus control fields. Accordingly, on the ground of adding a store unit for additional instructions use, such as a user definition register, and writing data in a microprocessor into the store unit, additional instructions are added easily.

Also, since instructions which appoints (or designates) a fixed-value register or an unrewritable register as a destination register operate as NOP instructions normally. Accordingly, even if additional instructions are added in a microprocessor, compatibility of software of the additional instructions with that of the microprocessor's own instructions is easily realized.

Further, in the microprocessor according to the present invention, data can be read from a device external to the microprocessor, such as a development tool. Therefore, the testing of circuits of a microprocessor may be realized easily. In addition, the development tool, such as a ROM emulator or an in-circuit emulator (ICE) may also be realized easily.

Further, the microprocessor according to the present invention includes instructions which operate similar to NOP instructions before adding additional instructions. The microprocessor includes units for utilizing the NOP instructions. Therefore, when instructions are added, data path control signals can be generated easily on the basis of the decoded signals of the instructions.

Furthermore, the microprocessor according to the present invention includes a gate circuit unit in the latter part of a control signal generation unit. Accordingly, data path control signals generated from the above decoded signals can be inputted to a data path easily. Therefore, a minimum change of hardware of the microprocessor makes it possible to realize addition or modification of instructions easily.

Furthermore, according to the present invention, a microprocessor to which instructions including a plurality of addressing modes can be added, are realized easily in the same way as using other rewritable registers.

What is claimed is:

1. A microprocessor for reading instructions, interpreting said instructions, and executing said instructions, including an unrewritable register and an instruction generation unit, wherein said instruction generation unit comprises:

an instruction register for receiving additional instruction codes, which express additional instructions, from outside of said microprocessor and storing said additional instruction codes;

a first instruction decoder connected to said instruction register for decoding at least a part of said additional instruction codes and for generating decoded signals;

a control circuit connected to said instruction decoder for receiving said decoded signals and generating signals on the basis of said decoded signals for executing said additional instructions;

a second instruction decoder connected to said instruction register for decoding other parts of said additional instruction codes, for determining whether said additional instructions are load instructions and whether said additional instructions designate said unrewritable register as a destination register, and for generating an active signal if said second instruction decoder determines that said additional instructions are load instructions and designates said unrewritable register as a destination register;

a timing generator connected to said second instruction decoder for receiving said active signal and for generating a write-signal by a cycle of writing data into a destination register; and an additional register connected to said timing generator through a data bus for storing said signals generated by said control circuit, on the basis of said write-signal.

2. The microprocessor according to claim 1, wherein said unrewritable register is a fixed-value register.

3. The microprocessor according to claim 1, wherein said additional instruction codes include a field for instructions distinction and a field for designation of said destination register.

4. A microprocessor for reading instructions, interpreting said instructions, and executing said instructions, including an unrewritable register and an instruction generation unit, wherein said instruction generation unit comprises:

an instruction register for receiving additional instruction codes, which express additional instructions from outside of said microprocessor, and storing said additional instruction codes;

an instruction decoder connected to said instruction register for decoding at least a part of said additional instructions codes and for generating decoded signals, wherein said instruction decoder further includes an additional instruction decoder section for decoding other parts of said instruction codes, for determining whether said additional instructions are NOP instructions, and for generating an active signal if said additional instructions are NOP instructions;

a control circuit connected to said instruction register for receiving said decoded signals and for generating signals on the basis of said decoded signals for executing said additional instructions;

an additional control signal generator connected to said additional instruction decoder section for receiving said activate signal and for generating additional control signals; and an additional register connected to said additional control signal generator and said control circuit through a gate circuit unit and a data path, for storing said signals generated by said control circuit on the basis of said additional control signals.

5. The microprocessor according to claim 4, wherein said additional instruction decoder section decides that said additional instructions are said NOP instructions if said other parts of said additional instruction codes indicate that said additional instructions designate said unrewritable register as a destination register.

6. The microprocessor according to claim 4, wherein said additional instructions include plural NOP instructions and said plural NOP instructions are assigned to different additional instruction codes.

7. The microprocessor according to claim 4, wherein said unrewritable register is a fixed-value register.

8. The microprocessor according to claim 5, wherein said unrewritable register is a fixed-value register.

9. The microprocessor according to claim 4, wherein said additional instruction codes include a field for instructions distinction and a field for destination register designation.

10. The microprocessor according to claim 5, wherein said additional instruction codes include a field for instructions distinction and a field for destination register designation.

11. A processing apparatus, comprising:

unrewritable storing means;

determining means for determining whether additional instructions from outside of said processing apparatus designates said unrewritable storing means as a destination storing means; and additional instructions storing means for storing said additional instructions, wherein said additional instructions are stored into said additional instructions storing means if said determining means determines that said additional instructions designate said unrewritable storing means as a destination storing means.

12. The processing apparatus according to claim 11, wherein said unrewritable storing means is a fixed-value storing means.

13. The processing apparatus according to claim 11, wherein instruction codes of said additional instructions include a field for instructions distinction and a field for designation of said destination storing means.

14. The processing apparatus according to claim 12, wherein instruction codes of said additional instructions include a field for instructions distinction and a field for designation of said destination storing means.

15. A processing apparatus, comprising:

deciding means for deciding whether additional instructions from outside of said processing apparatus are NOP instructions; and active signal generation means for generating an active signal if said deciding means decides that said additional instructions are NOP instructions;

wherein said additional instructions are added to said processing apparatus on the basis of said active signal.

16. The processing apparatus according to claim 15, further comprising unrewritable storing means, wherein said deciding means decides that additional instructions are regarded as said NOP instructions if said additional instructions designate said unrewritable storing means as a destination storing means.

17. The processing apparatus according to claim 16, wherein said unrewritable storing means is a fixed-value storing means.

18. The processing apparatus according to claim 16, wherein instructions codes of said additional instructions include a field for instructions distinction and a field for designation of a destination storing means.

19. The processing apparatus according to claim 15, wherein said additional instructions include plural NOP instructions and said plural NOP instructions are assigned to different additional instruction codes.

20. An instructions addition method to a processing apparatus, comprising the steps of:

decoding additional instructions from outside of said processing apparatus;

deciding whether said additional instructions designate unrewritable storing means in said processing apparatus as a destination storing means; and storing said additional instructions into additional instructions storing means if it is decided that said additional instructions designates said unrewritable storing means as a destination storing means.

21. The instructions addition method according to claim 20, wherein said unrewritable storing means is a fixed-value storing means.

22. An instructions addition method according to claim 20, wherein instruction codes of said additional instructions include a field for designation of said destination storing means and the step of storing stores said additional instructions into said additional instructions storing means if said step of deciding decides that said field for designation of said destination in said additional instructions express to designate said unrewritable storing means as a destination storing means.

23. An instructions addition method according to claim 21, wherein instruction codes of said additional instructions include a field for designation of said destination storing means and the step of storing stores said additional instructions into said additional instructions storing means if said step of deciding decides that said field for designation of said destination in said additional instructions express to designate said unrewritable storing means as a destination storing means.

24. An instructions addition method to a processing apparatus, comprising the steps of:

deciding whether additional instructions from outside of said processing apparatus are NOP instructions;

generating an active signal if said step of deciding decides that said additional instructions are NOP instructions; and adding said additional instructions to said processing apparatus on the basis of said active signal.

25. The instructions addition method according to claim 24, further comprising the step of regarding said additional instructions as said NOP instructions if said additional instructions designate an unrewritable storing means in said processing apparatus as a destination storing means.

26. The instructions additional method according to claim 25, wherein instruction codes of said additional instructions include a field for designation of said destination storing means and wherein the step of regarding regards said additional instructions as said NOP instructions if said field for designation of said destination express to designate said unrewritable storing means as a destination storing means.

27. The instructions addition method according to claim 25, wherein said unrewritable storing means is a fixed-value storing means.

28. An instructions addition method according to claim 24, wherein said additional instructions include plural NOP instructions, and wherein the step of generating generates said active signal if said step of deciding decides that said additional instructions are one of said plural NOP instructions.

* * * * *

UNITED STATES PATENT AND TRADEMARK OFFICE
CERTIFICATE OF CORRECTION

PATENT NO. : 5,742,801
DATED : April 21, 1998
INVENTOR(S) : Masanobu FUKUSHIMA, et al.

It is certified that error appears in the above-indentified patent and that said Letters Patent is hereby corrected as shown below:

Cover page, item [30], third line, please change "7-089253" to --7-089353--

Signed and Sealed this

Sixteenth Day of June, 1998

Attest:

BRUCE LEHMAN

Attesting Officer

Commissioner of Patents and Trademarks